United States Patent
Sperry

(10) Patent No.: US 8,038,589 B2
(45) Date of Patent: Oct. 18, 2011

(54) SYSTEM AND METHOD FOR A MODULAR OBSTACLE COURSE WITH VARIABLE DIFFICULTY

(75) Inventor: Scott C. Sperry, Dallas, TX (US)

(73) Assignee: Life Cirque, LLC, Dallas, TX (US)

( * ) Notice: Subject to any disclaimer, the term of this patent is extended or adjusted under 35 U.S.C. 154(b) by 1133 days.

(21) Appl. No.: 11/201,631

(22) Filed: Aug. 10, 2005

(65) Prior Publication Data

US 2006/0046234 A1   Mar. 2, 2006

Related U.S. Application Data

(60) Provisional application No. 60/604,229, filed on Aug. 25, 2004.

(51) Int. Cl.
 *A63B 23/00* (2006.01)
 *A63B 71/00* (2006.01)
(52) U.S. Cl. .................. 482/148; 482/8; 482/35
(58) Field of Classification Search .......... 482/1–8, 482/900–902, 35, 14, 15, 148; 434/255; 472/85, 62
See application file for complete search history.

(56) References Cited

U.S. PATENT DOCUMENTS

| | | | | |
|---|---|---|---|---|
| 3,846,704 A | * | 11/1974 | Bessette | .................. 340/870.28 |
| 4,028,693 A | * | 6/1977 | Kuntz | ....................... 340/323 R |
| 4,645,458 A | | 2/1987 | Williams | |
| 6,013,007 A | * | 1/2000 | Root et al. | ....................... 482/8 |
| 6,746,370 B1 | * | 6/2004 | Fleming et al. | ................... 482/1 |
| 7,060,002 B1 | * | 6/2006 | Boehme | .......................... 482/35 |
| 7,212,659 B2 | * | 5/2007 | Noro et al | ..................... 382/128 |
| 7,480,512 B2 | * | 1/2009 | Graham et al. | ............ 455/456.3 |
| 2003/0008756 A1 | * | 1/2003 | Pino | ............................. 482/148 |
| 2003/0134645 A1 | * | 7/2003 | Stern et al. | ..................... 455/456 |
| 2003/0216228 A1 | * | 11/2003 | Rast | ............................... 482/84 |
| 2004/0027365 A1 | * | 2/2004 | Sayers et al. | .................. 345/700 |
| 2004/0152061 A1 | * | 8/2004 | Patire | ............................ 434/308 |
| 2007/0213126 A1 | * | 9/2007 | Deutsch et al. | ................. 463/36 |

FOREIGN PATENT DOCUMENTS

WO   WO 01/70345   9/2001

OTHER PUBLICATIONS

Communication and Extended European Search Report, Application No. 05789827.2-1260 / 1789145 PCT/US2005029883, Dec. 2, 2009, 6 pages.
The First Office Action from the Patent Office of the State Intellectual Property Office of the People's Republic of China and Text of First Office Action; date of dispatch Dec. 11, 2009 and received Jan. 5, 2010; 9 pages.

* cited by examiner

*Primary Examiner* — Loan Thanh
*Assistant Examiner* — Shila Jalalzadeh Abyane

(57) ABSTRACT

A system and method are provide for an obstacle course including first and second lanes associated with first and second difficulty ratings, respectively. The first lane includes a first plurality of obstacles associated with the first difficulty rating and the second lane includes a second plurality of obstacles associated with the second difficulty rating. The first difficulty rating indicates greater difficulty than the second difficulty rating.

25 Claims, 4 Drawing Sheets

SYSTEM AND METHOD FOR A MODULAR OBSTACLE COURSE WITH VARIABLE DIFFICULTY

RELATED APPLICATIONS

This application claims the priority benefit of U.S. Provisional Application Ser. No. 60/604,229, entitled "Timed, Interactive, Themed, Challenge-Modified Obstacle Course," filed Aug. 25, 2004, the contents of which are hereby incorporated by reference.

TECHNICAL FIELD

The present invention relates generally to exercise systems and more specifically to a system and method for a modular obstacle course with variable difficulty.

BACKGROUND

Various exercise systems have previously been used. Traditional exercise systems may include boot camps, obstacle courses, rock climbing gyms, ropes courses, Navy SEAL courses (special forces courses), traditional gyms, and traditional health clubs.

The importance of exercise as part of a healthy lifestyle is well documented and accepted. Exercising regularly not only has the potential to prolong life, it can also reduce the chance of developing many illnesses such as heart disease and diabetes. Regular exercise can also be used to improve overall fitness and appearance and improve self confidence.

SUMMARY

In accordance with a particular embodiment of the present invention, an obstacle course includes first and second lanes associated with first and second difficulty ratings, respectively. The first lane includes a first plurality of obstacles associated with the first difficulty rating and the second lane includes a second plurality of obstacles associated with the second difficulty rating. The first difficulty rating indicates greater difficulty than the second difficulty rating.

In certain embodiments, the obstacle course may also include an observation area, wherein users of the observation area can view the first lane and wherein a view of the second lane is at least partially obscured from the users of the observation area. The obstacle course may also include a first module with a first obstacle from the first plurality of obstacles and a first obstacle from the second plurality of obstacles, and a second module with a second obstacle from the first plurality of obstacles and a second obstacle from the second plurality of obstacles. The first and second modules may also be interchangeable. Particular embodiments of the present invention may also include at least one user interface operable to recognize a user based on a characteristic of the user and measure at least one biological indicator of the user. The user interface may also be operable to present to the user at least one performance measurement.

In accordance with another embodiment of the present invention, a method of exercising includes choosing between a first difficulty rating and a second difficulty rating, the first difficulty rating indicating greater difficulty than the second difficulty rating. The method also includes traversing an obstacle in a first lane or a second lane, based on the chosen first or second difficulty rating, the first lane being associated with the first difficulty rating and including a first plurality of obstacles, the second lane being associated with the second difficulty rating and including a second plurality of obstacles.

Technical advantages of certain embodiments of the present invention include the ability to track a users progress through the obstacle course and provide feedback to the user during and upon completing the obstacle course. Sensors may be used to measure various biological or performance indicators of a user of the obstacle course before, during, and after running the course. The feedback provided to a user may include improvements over prior runs or comparisons to other users of the same age or fitness level. In certain embodiments, the particular items of feedback that the user is given may be selected by the user.

Another technical advantage of particular embodiments of the present invention may include the ability to interchange obstacle elements. The obstacle elements may be divided into modular elements having approximately the same footprint, or floor dimensions. The modular elements may easily be interchanged with other modules. A module may consist of a particular obstacle and may be divided into lanes. The different lanes of the module may contain the same or similar obstacles, but the difficulty of the obstacle in different lanes may be different. In this manner, modules may be interchanged and users of different fitness levels may use any of the modules.

An additional technical advantage of particular embodiments of the present invention may include the more difficult lanes of the obstacle course providing entertainment for observers while the less difficult lanes are sheltered from viewing. An observation deck may surround the obstacle course and allow people who are not users of the obstacle course to view only certain users of the obstacle course. Users of the obstacle course that are less fit may use the obstacle course in lanes that are not visible to the users of the observation deck. Users of the obstacle course that are more fit may use lanes that may be observed by users of the observation deck. In this manner, the users of the observation deck may be entertained by the users of the obstacle course without exposing the less fit users of the obstacle course to undesired attention.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF EXAMPLE EMBODIMENTS OF THE INVENTION

Conventional exercise systems may not accommodate all challenge and fitness levels, particularly people who are out of shape, sedentary, or overweight. Many traditional exercise systems are designed for participants who are already in reasonably good shape. Furthermore, conventional obstacle courses are generally only capable of measuring participants' progress by the length of time a participant requires to complete the course. This may be frustrating for participants looking for progress feedback and motivation.

Figure 1A:
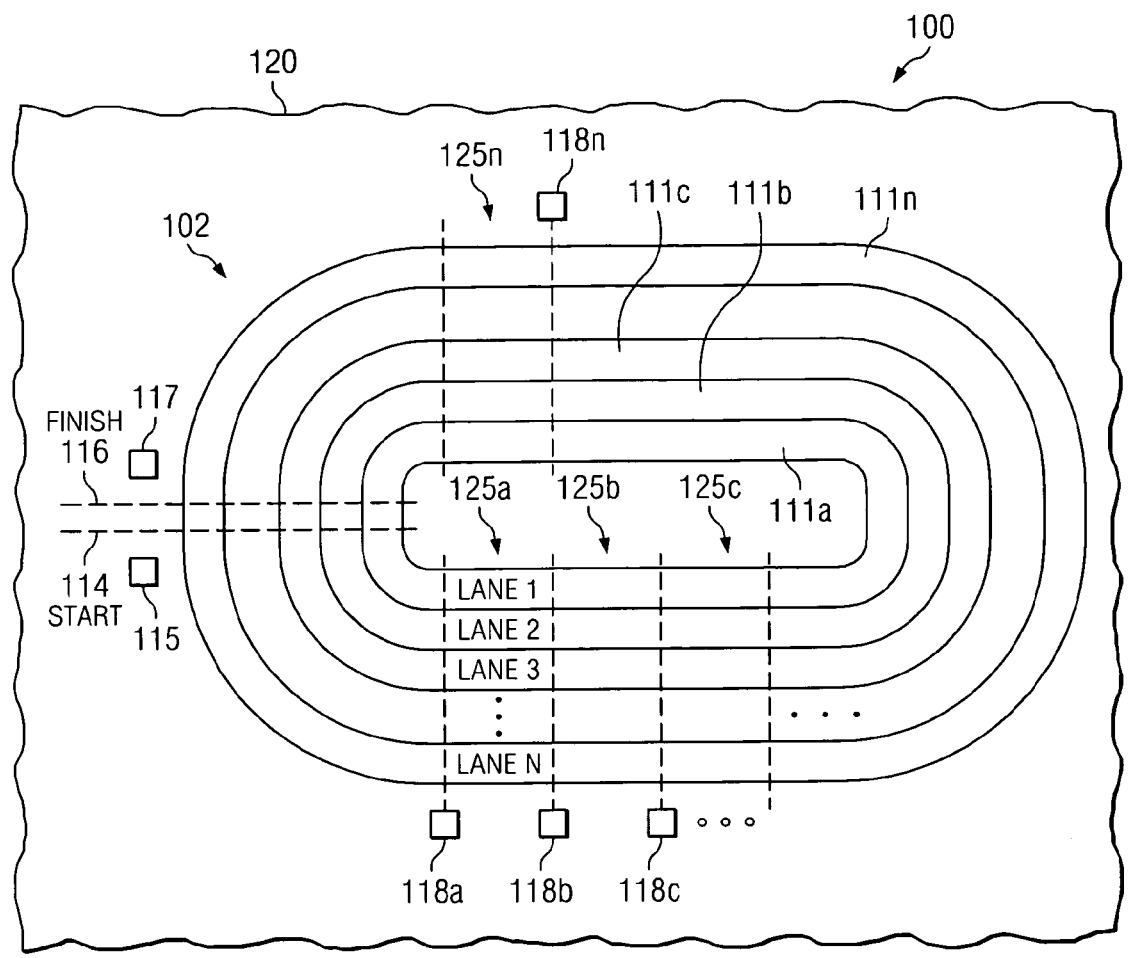
FIG. 1A illustrates a top view of a modular, multi-lane obstacle course with an observation deck in accordance with one embodiment of the present invention.

FIG. 1A illustrates one embodiment of exercise system 100 including an obstacle course 102 and observation area 120. Obstacle course 102 may be divided into a plurality of lanes 111 of varying difficulty. For instance, lane 111a may have a greater difficulty rating than lane 111b. A greater difficulty rating may indicate that lane 111a is more difficult than lane 111b, which has a lower difficulty rating. Because obstacle course 102 includes lanes 111 with different difficulty ratings, obstacle course 102 may be used by people having significantly different fitness levels. For example, a person who is more fit may choose to use a lane 111 with a high difficulty rating. Conversely, a beginner, or a person who is less fit may choose to use a lane 111 with a low difficulty rating. By including variable difficulty ratings across lanes 111, obstacle course 102 may be used by people of practically any fitness level and provide an enjoyable and appropriately challenging and athletic experience for all users. Moreover, more than one user may use a lane 111 at a time. In some embodiments, lanes 111 may be six to eight feet wide to accommodate teams of users traversing obstacle course 102 together.

Each lane 111 may include a plurality of obstacles that correspond to the difficulty rating associated with the particular lane 111. For example, if lane 111a is associated with the highest difficulty rating, a plurality of obstacles present in lane 111a will also be associated with the highest difficulty rating. Likewise, if lane 111b is associated with a second highest difficulty rating, a plurality of obstacles present in lane 111b may also be associated with the second highest difficulty rating. A person beginning a run through obstacle course 102 should choose a desired difficulty and choose a lane 111 corresponding to that desired difficulty. The user may then run the entire obstacle course 102 in the selected lane 111, or may change lanes between obstacles to achieve a desired difficulty rating for the particular obstacle with which the user is confronted. For example, if a user chooses the highest difficulty for the first obstacle, and therefore chooses lane 111a, the user may switch to a lower difficulty lane, such as lane 111b, when the user is faced with an obstacle that the user historically has a harder time completing or simply does not want to attempt in lane 111a. In some embodiments, obstacle course 102 may include a lane 111 without any obstacles. This lane may have a difficulty rating of zero and may allow users of obstacle course 102 wishing to skip a particular obstacle to switch to the zero difficulty rating lane 111 until past the obstacle. A lane 111 without any obstacles may also allow ingress and egress for emergency assistance personnel.

Obstacle course 102 is divided into a plurality of modules 125. In this embodiment, modules 125 may include a plurality of obstacles of varying difficulties. A particular module 125, such as module 125a, may include an obstacle in each lane 111. The obstacles of module 125a may be of varying difficulties such that a user of lane 111a faces an obstacle with a greater difficulty rating than a user of lane 111b. The obstacles in module 125a may be similar obstacles in that the same obstacle element, such as for example a rope ladder or object carry, are presented to users of each lane 111, but the relative difficulties of the obstacle elements present in different lanes 111 may be appropriate to the difficulty rating of the particular lane 111. For example, if the obstacle element in module 125a is a rope ladder, a user of lane 111a may confront a rope ladder that is taller or has larger spaces between the rungs of the rope ladder than a user of lane 111b may confront.

In certain embodiments, a module 125 may include single or multiple obstacle elements that span each of lanes 111 but do not necessarily include the varying difficulty ratings present across lanes 111. In this embodiment, users of the various lanes 111 may choose to take any path through the obstacle regardless of difficulty rating as the entire module may be rated with a single difficulty rating. An example of this may be a module 125 that includes a large obstacle, such as a mock up of a pirate ship or a trampoline, that is designed more for the enjoyment of the users of obstacle course 102 rather than to challenge users of obstacle course 102.

Modularizing obstacles in obstacle course 102 may allow for individual modules 125 to be interchangeable with other modules. Some or all of the modules may be interchangeable with some or all of the other modules. In some embodiments, obstacles placed in areas with a particular geometric shape, such as obstacles placed around curves, may be interchangeable with other obstacles placed in areas with similar geometric shape. In certain embodiments, the modularity of the obstacles may be achieved by designing each module around one or more "footprints" or specific base areas and shapes. In other embodiments, modules may include the flexibility to adapt to larger or smaller spaces or to take on different shapes such as boxed, angular, or curved. Modularity may allow the order of modules 125 within obstacle course 102 to be rearranged, may allow older modules 125 to be swapped out with newer modules 125, or may allow trading of modules 125 between obstacle course 102 and another obstacle course. In certain embodiments, the beginning and end of a module 125 may correspond with the beginning and end of an obstacle. In this embodiment, interchanging modules 125 is synonymous with interchanging obstacles. Adding, removing, or rearranging obstacles within obstacle course 102 may provide the users of obstacle course 102 with a consistently changing, entertaining, and challenging obstacle course 102. As a module 125 may include obstacles corresponding to a variety of difficulty ratings, modules 125 may be added, removed, or rearranged and obstacle course 102 may still provide an enjoyable and rewarding experience for users of practically any fitness level. Furthermore, one or more of modules 125 may be removed from obstacle course 102 and provided as a warm up or play area.

Any number, type, and arrangement of obstacles fall within the scope of the present invention. For example, in certain embodiments individual modules may be themed modules, for example a fire house, lumber mill, pirate ship, etc., and contain collections of associated obstacles, for example a fire pole, log roll, or ship's rigging, respectively. In certain embodiments, the obstacles may include elements that move in a variety of ways. The movement of the obstacle elements may be caused by users of the obstacle, users of other obstacles, by users of observation area 120, or by elements of other obstacles. Furthermore, the themed modules may include various entertaining and amusing sub-elements like theme-garbed coaches and creatures, for example a fireman, lumberjack, or pirate, respectively. The coaches may be automated electronics or human beings. The coaches may aid users of the obstacle course by encouraging and pushing users to perform at their peak, and coaches may also be present in the course for safety and emergency medical care. Themed modules may have appropriate safety measures built in, for example mats, nets, cushioning, auto-belayers, harnesses, etc., to ensure a safe experience for all ages and skill levels.

In the embodiment illustrated in FIG. 1A, obstacle course 102 is illustrated as having an oval shape. The particular shape of obstacle course 102 may vary, and obstacle course 102 may be practically any shape, including circular, square, rectangular, triangular, or any other desired shape. Moreover, obstacle course 102 may include layered obstacles such that the base of the course does not reside in only one plane. An example of this may be a series of obstacles built into a base that spirals upwards. Users of this embodiment may go up and down the spiraling obstacle course, or once reaching the top, users may take another route to the bottom, such as a slide or rope. Other users may take a approximately vertically oriented route to the top, such as a rock wall or rope ladder, and then traverse the obstacle course in a downhill direction. In particular embodiments, the shape of obstacle course 102 may be selected to correspond to space available in a building or space available on a particular piece of land. Further, while obstacle course 102 has been illustrated as a loop, obstacle course 102 may also have a straight line layout (single set of lanes), or a down-and-back layout (two sets of lanes). Additionally, obstacle course 102 has been illustrated as being directional with a set start point and end point. However, obstacle course 102 may be bi-directional, may be reversible, may include starting and ending points at any location, or may not include starting or ending points. In addition, obstacle course 102 may be constructed indoors or outdoors, with a covering/enclosure, or without a covering/enclosure.

Obstacle course 102 has been illustrated in FIG. 1A with a start 114 and a finish 116. A user of obstacle course 102 may begin at start 114. Exercise system 100 may include a user interface 115 at start 114 of obstacle course 102. User interface 115 may be capable of recognizing a user based on a characteristic of the user. The characteristic of the user recognizable by user interface 115 may include a fingerprint, a retinal image, DNA signature, or other appropriate method of recognizing a particular user of obstacle course 102. In an alternate embodiment, the characteristic of the user could be an issued UPC code, magnetic card, chip, or other identification method.

User interface 115 may also be capable of measuring at least one biological indicator of the user. Biological indicators of a user may include, for example, weight, body fat percentage, pulse rate, blood pressure, respiration rate, or any other measurable indicator of the state of the human body. User interface 115 may include one or more biometric sensors operable to measure the biological indicators of the user. Obstacle course 102 may also include a user interface 117 at finish 116. User interface 117 may be similar to user interface 115 and may be capable of recognizing a user and measuring the same or different biological indicators as user interface 115. Measuring one or more biological indicators of a user at start 114 and at finish 116 may allow a comparison of the biological indicators from the time the user began obstacle course 102 until the user completed obstacle course 102. The change in the biological indicators may be used to provide the user with feedback on how she performed on the obstacle course and her progress toward her fitness goals.

Various additional user interfaces 118 may also be interspersed between or within one or more of modules 125. User interfaces 118 may be capable of recognizing a user based on a characteristic of the user and of recommending to the user the most suitable difficulty rating and lane 111 for the user based on one or more performance indicators of the user. In particular embodiments, user interfaces 118 may also present one or more of the users biological indicators or performance indicators to the user, either audibly or visually, and suggest that the user either increase or reduce her pace through obstacle course 102. In this manner, the pace of the user may be adjusted to regulate their biological indicators and/or performance indicators and thereby provide the most effective exercise to the user. User interfaces 118 may recognize a user in the same manner as user interface 115. The performance indicators measured and/or referenced by user interface 118 may include: any of the biological indicators described with reference to user interface 115, the current performance of the user, the past performance of the user, and/or a comparison with other users of obstacle course 102 that share similar characteristics with the user. Performance indicators measuring current performance of the user may include, for example, the amount of time the user required to complete the previous obstacle, or the amount of time the user has required to complete obstacle course 102 to the current point. Performance indicators measuring past performance of the user may include, for example, the amount of time the user previously took on the upcoming obstacle, or the amount of time the user has taken to reach the current point in obstacle course 102 on previous runs through obstacle course 102. Performance indicators based on characteristics shared with other users may include, for example, age, weight, or other factors potentially relevant to performance on the upcoming obstacle.

After recording and/or referencing the performance indicators of the user, user interface 118 may suggest to the user that the user stay in the same lane 111, switch to a more difficult lane 111, or switch to a less difficult lane 111 to complete the upcoming obstacle. The user may indicate her selection and proceed to complete the obstacle. User interfaces 118 may only provide lane suggestions to users of obstacle course 102, or one or more of user interfaces 118 may be utilized to measure and record the various biological indicators described above and/or record the time that the user accessed the user interface. In particular embodiments, user interfaces 118 may not provide lane suggestions or measure biological or performance indicators, but may only register the time that the user accessed the user interface 118.

User interfaces 118 may be located before or after a module, within a module, or may be selectively arranged along obstacle course 102 in any desired manner. In particular embodiments, user interfaces 118 are not present and the only user interfaces around obstacle course 102 are user interface 115 and user interface 117. In particular embodiments, user interface 115 and user interface 117 may be incorporated into a single user interface. Potentially any number of user interfaces 118 may be used before, after, or within any of modules 125. Although a single user interface 118 has been illustrated in front of modules 125, user interfaces 118 may include multiple user interfaces located within or adjacent to each of lanes 111. Utilizing this arrangement, users traversing obstacle course 102 in each of lanes 111 may remain in their respective lanes 111 and still benefit from the measurements and/or suggestions of user interfaces 118.

In an alternative embodiment, users of obstacle course 102 may wear one or more devices capable of measuring biological indicators of the user. These wearable devices may report wirelessly to one or more of user interfaces 115, 117, or 118, or may be capable of being docked with user interfaces 115, 117, or 118. In certain embodiments, the wearable devices may be capable of identifying the users location within obstacle course 102 and suggesting which lane the user should take for upcoming obstacles. The wearable devices may also record and/or transmit its location to track the users timing while traversing obstacle course 102. The wearable device may utilize Radio Frequency Identity tags (RFID), a wireless protocol such as 802.11, or any other wireless transmitting technology or protocol.

Any of user interfaces 115, 117, or 118 may be capable of recording a time that the user accessed the user interface 115, 117, or 118. Any of the performance indicators or biological indicators measured and/or referenced with respect to the user may be compiled, cross referenced, and analyzed to provide at least one performance measurement to a user of obstacle course 102. The performance measurements may be in the form of a report that may be viewed or printed by the user at user interface 117 substantially simultaneously with completing obstacle course 102. Some examples of performance measurements that may be provided to a user include: changes in the biological indicators of the user from beginning until completing obstacle course 102, a change in the performance of the user compared to historical performances of the user, a comparison of the performance of the user to historical performance of other users that share at least one performance characteristic with the user, or any other performance measurement that a particular user desires. In certain embodiments, a user may specify and/or define each performance measurement she would like to receive upon completing obstacle course 102. In this manner a user of obstacle course 102 may receive near-immediate feedback on her performance based on self-selected criteria.

Figure 1B:
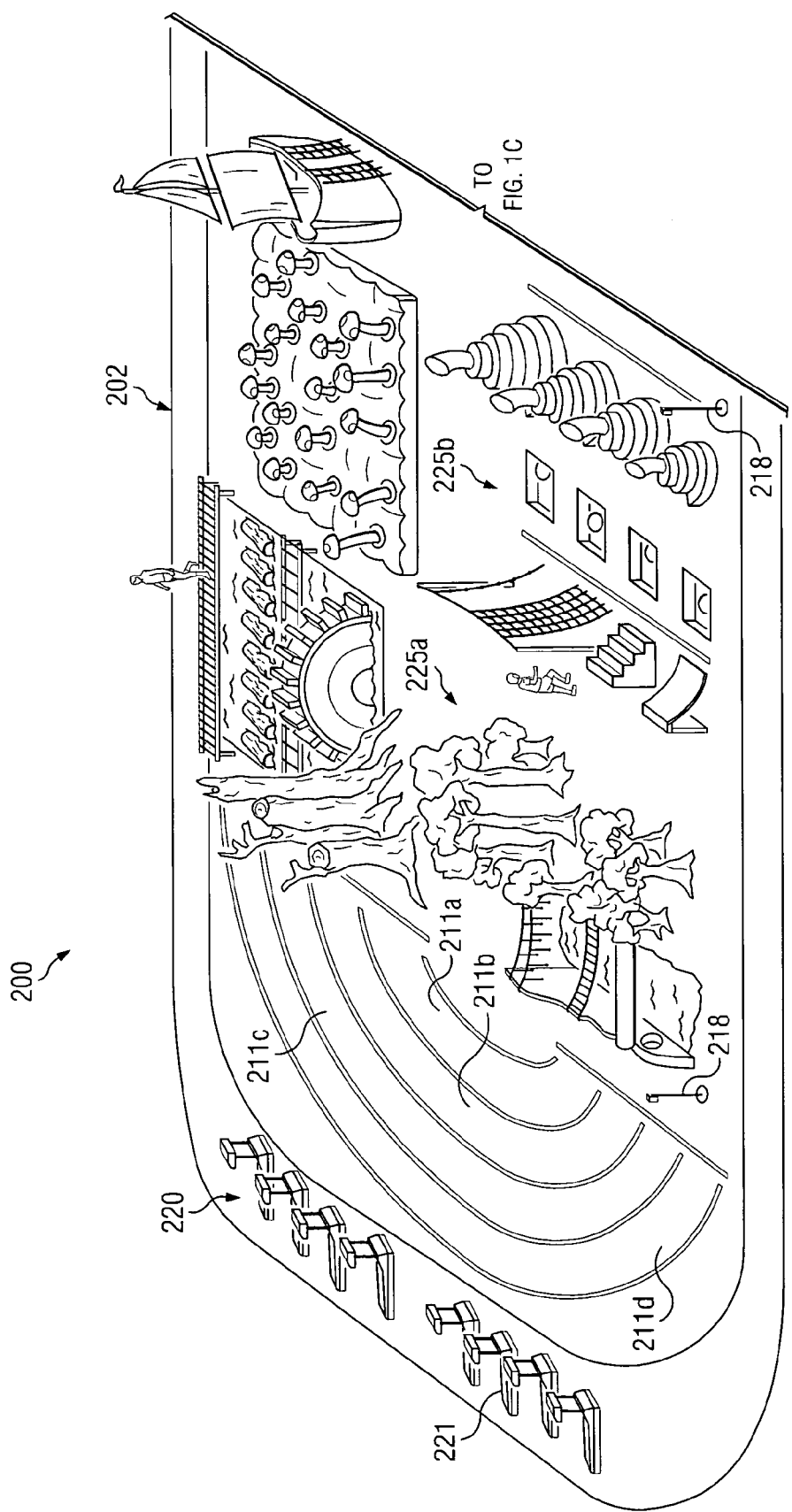
FIGS. 1B and 1C illustrate one embodiment of a modular, multi-lane obstacle course with an observation deck in accordance with one embodiment of the present invention.
Figure 1C:
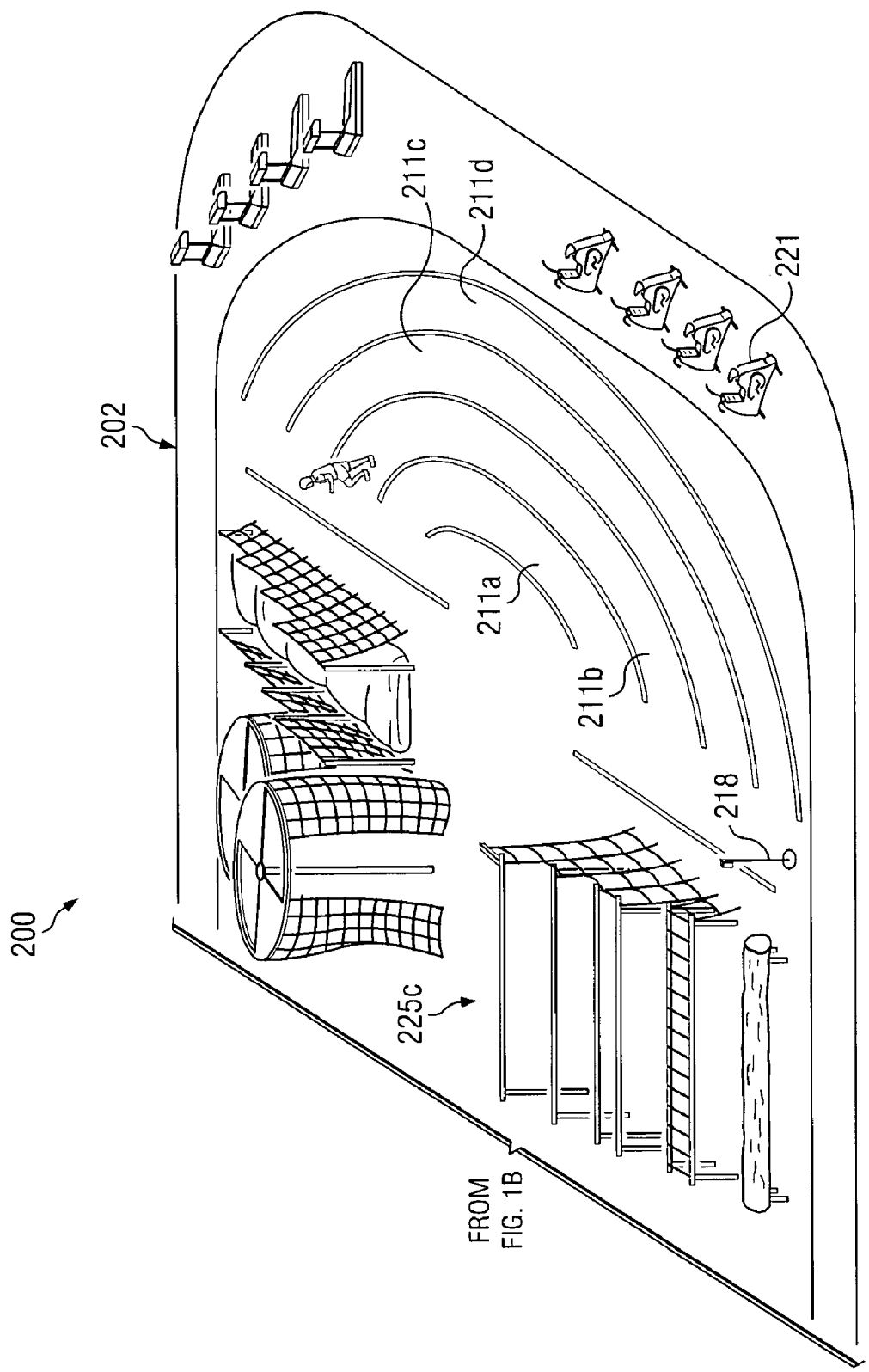

FIGS. 1B and 1C illustrate an exercise system 200 in accordance with a particular embodiment of the present invention. Exercise system 200 includes obstacle course 202 and observation area 220. A plurality of exercise machines 221 are arranged around observation area 220. Users of exercise machines 221 may view users of obstacle course 202 while exercising on observation area 220. Obstacle course 202 also includes a plurality of lanes 211a-d and a plurality of modular obstacles 225a-c. As a user of obstacle course 202 traverses obstacles 225 in one of lanes 211, the user may also interact with user interfaces 218, which may include any of the functionality described above with reference to user interfaces 115, 117, and 118.

Figure 2:
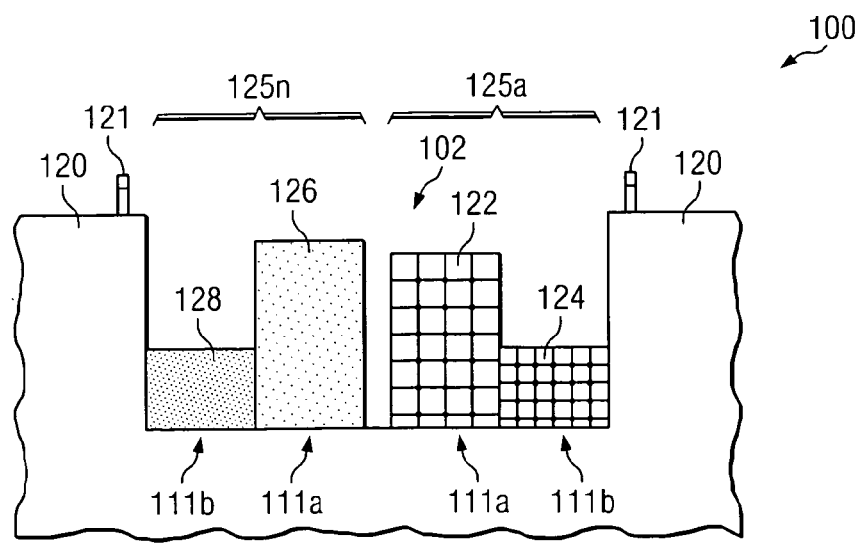
FIG. 2 illustrates a side view of a layout of obstacles in lanes such that the lanes have different difficulties and the less difficult lanes are at least partially obscured from observation by users of an observation deck, in accordance with a particular embodiment of the present invention.

FIG. 2 illustrates a side view of a portion of exercise system 100. For simplicity obstacle course 102 has been illustrated with only two lanes 111a and 111b in FIG. 2. However, it should be understood that practically any number of lanes may be included in obstacle course 102. FIG. 2 also illustrates one possible layout of observation area 120 with respect to obstacle course 102. Users of observation area 120 may observe users of obstacle course 102 that are using lane 111a, but users of observation area 120 will not be able to easily view users of obstacle course 102 using lane 111b. This is the case due to the layout of observation area 120 relative to obstacle course 102 and also due to the layout of the obstacles in lane 111a relative to the obstacles in lane 111b.

In the embodiment illustrated in FIG. 2 observation area 120 is elevated above the base level of obstacle course 102. Observers standing in the observation area 120 may be restricted from approaching the edge of observation area 120 by a safety railing or wall 121. This layout will make it difficult for users of observation area 120 to view the obstacle 124 or 128 in lane 111b that is closest to the user of the observation area. The obstacle 124 or 128 opposite the observation area 120 in which the user of the observation area 120 is standing will correspondingly be obscured by obstacles 122 or 126 in lane 111a. Therefore the view of lane 111b will be a least partially obscured to any user of observation area 120 regardless of the user's location in the observation area 120 or the placement of any particular portion of lane 111b. It should be noted that lane 111b has a lower difficulty rating than lane 111a and therefore is more likely to be used by individuals who are less fit. The less fit users of lane 111b are less likely to amenable to observation by users of observation area 120. Therefore, the arrangement of obstacle course 102 relative to observation area 120 provides the users of lane 111b with some measure of privacy. The users of lane 111b may be at least partially obscured from viewing by the users of observation area 120 for the entire time they are using obstacle course 102.

In an alternative embodiment, portions of observation area 120 may overhang some or all of lane 111b. In another alternative embodiment, the relative layout of obstacles may provide privacy to the users of the less difficult lanes 111 regardless of the relative heights of obstacle course 102 and observation area 120. In this embodiment, the order of lanes 111 may be the opposite of the layout illustrated in FIGS. 1 and 2 such that lanes 111 having a greater difficulty rating are located on the outside of lanes 111 having lesser difficulty ratings. This layout would shield users of the less difficult lanes 111 from observation by users of observation area 120 by locating the taller or more difficult obstacles between users of observation area 120 and the users of the less difficult lanes 111. While observation area 120 has been illustrated as being outside of obstacle course 102, one or more observation areas could be located inside an inner loop of obstacle course 102 or at various points between lanes 111. In some embodiments, the users of observation area 120 may interact with users of obstacle course 102, or the obstacle course elements. For example, a user of observation area 120 may be able to actuate a trap door within obstacle course 102. As a further example, a user of observation area 120 may be able to shoot items such as tennis balls or water at a user of obstacle course 102. Therefore, the relative placement of observation area 120 to obstacle course 102 may allow such interactions between users. Further alternative embodiments may include any layout of obstacle course 102 and observation area 120 that provides a measure of privacy to users of the less difficult lanes 111.

FIG. 2 also illustrates the relative difficulty ratings between lanes 111a and 111b. Taking for example obstacle 122 and obstacle 124, obstacles 122 and 124 are similar because both obstacle 122 and obstacle 124 are rope ladders. However, obstacle 124 is considerably easier to traverse than obstacle 122. Therefore, obstacle 122 would have a higher difficulty rating than obstacle 124 and users who are less fit may be recommended to use obstacle 124 while users who are more fit may be recommended to use obstacle 122. Although obstacle 122 and obstacle 124 are both rope ladders, the difficulty between obstacle 122 and obstacle 124 may be adjusted in a variety of ways. For example, obstacle 122 is illustrated as being higher than obstacle 124. As another example, the rungs of rope ladder 124 may be spaced more closely together than the rungs of rope ladder 122. As another example of relative difficulty, obstacles 126 and 128 are similar obstacles as they are both climbing walls. Obstacle 126 may be considerably higher than obstacle 128. Furthermore, the hand and foot holds available on obstacle 128 may be spaced more closely together than the hand and foot holds on obstacle 126. The increased height of obstacles 122 and 126 compared to obstacles 124 and 128 not only makes obstacles 122 and 126 more difficult, it also allows obstacles 122 and 126 to at least partially obscure the view of obstacles 124 and 128 from users of observation area 120.

Obstacles may be made more or less difficult in many ways. For example: irregular or distant spacing of rungs makes climbing more difficult because rung size and spacing pattern change the challenge level; adding handles or grasp-assisting loops, knots, or stops to climbing rope makes for easier ascent and descent; openings through obstacle elements may be different sizes so as to filter heavy or wide participants; elements with few or no hand and foot holds are more challenging than those with more; overly large or small handles are more challenging than regular handles; vertical traversing is considerably more challenging than most horizontal travel; supporting one's own body weight completely with the arms (as in a pull-up) is more challenging than assisting with the legs; big steps are more challenging than smaller ones; fixed ladders are easier to climb than rope ladders. Therefore, practically any obstacle can be made more or less challenging.

As illustrated in FIG. 2, obstacles 122 and 124 may be included in module 125a. Likewise obstacles 126 and 128 may be included in module 125n. As illustrated by modules 125a and 125n, a module 125 may include a plurality of similar obstacles of varying difficulties. A footprint of module 125a may have approximately the same dimensions as a footprint of module 125n such that modules 125a and 125n may be interchangeable. In addition to being interchangeable with each other, modules 125 may be interchanged with other modules from obstacle course 102 or other obstacle courses.

Figure 3:
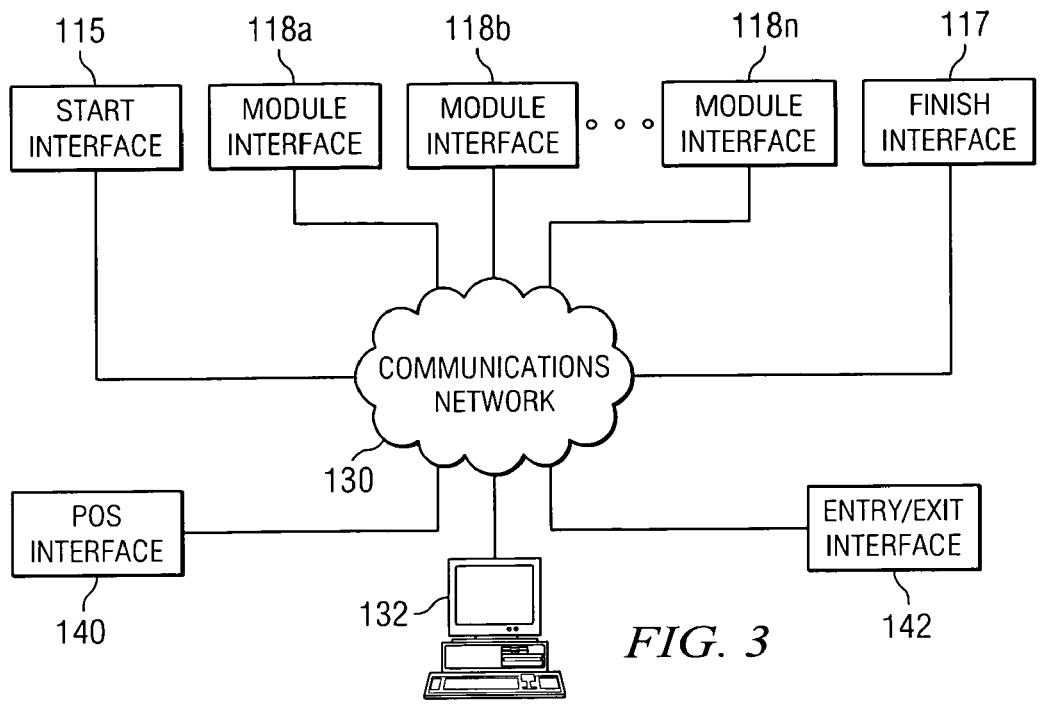
FIG. 3 illustrates a network of user interfaces that may communicate with each other and with a central computer to track a user's progress and provide feedback to the user in accordance with a particular embodiment of the present invention.

FIG. 3 illustrates a computer network for compiling and analyzing user biological indicators and performance indicators. In the embodiment illustrated in FIG. 3, start interface 115, a plurality of module interfaces 118, and finish interface 117 are coupled for communication over a communications network with a central computer 132. The various user interfaces 115, 117, and 118 may communicate with each other, with central computer 132, or with any other communication device coupled to communications network 130. Communications network 130 allows the various user interfaces 115, 117, and 118 to share information with the other interfaces or store information from the other interfaces as well as upload information to central computer 132. Central computer 132 may be a central repository and analysis station for data and measurements collected from the various interfaces 115, 117, and 118. Central computer 132 may compile the data collected into a database for later statistical analysis and performance measurement calculation.

As an example, in one embodiment, central computer 132 may receive a start time from start interface 115 for a particular user. Accompanying the start time may be one or more biological indicators recorded by start interface 115 as well as an indicator of the identity of the user. The central computer 132 may add the information from start interface 115 to an existing record if a record already exists for the user or central computer 132 may start a new record if the user is a new user. As the user traverses the obstacle course, each of modules 118 may report a time and any biological indicators measured by the module interfaces 118 to central computer 132. This information may be added to the record for the user. When the user completes the obstacle course and checks in at finish interface 117, finish interface 117 may record the identity and the time of the user along with any biological indicators measured at finish interface 117 and send these to central computer 132. In certain embodiments, the user may also indicate at finish interface 117 which performance measurements the user desires feedback on. The desired performance measurements may also be communicated to central computer 132.

In an alternate embodiment, the performance indicators on which the user wishes to receive information may already be stored in the user's profile in the database of central computer 132. In the embodiment where a profile is stored by central computer 132, users may modify the profile at any time to change which biological indicators are measured along the obstacle course or to change which performance measurements they receive upon completing the obstacle course. In certain embodiments, communications network 130 may be a global communications network such as the Internet. In such embodiments, a user may modify their preferences and view their performance measurements from any computer or console having access to the Internet.

In certain embodiments, communications network 130 may include a local area network (LAN), a wide area network (WAN), a public switch telephone network (PSTN), the Internet, or other electrical or optical network capable of sending information as signals or packets, either over wired or wireless networks. Central computer 132 may be local to the obstacle course and the various user interfaces 115, 117, 118, or central computer 132 may be at a remote location. Whether central computer 132 is local or remote, central computer 132 may collect user information from either local or remote user interfaces. In this manner central computer 132 may be used to collect information from more than one obstacle course. When collecting information from more than one obstacle course, central computer 132 may make more accurate statistical correlations and provide better performance measurements to individual users. In alternate embodiments, central computer 132 may be included in one of user interfaces 115, 117, or 118.

In particular embodiments, information collected by central computer 132 may be used to further benefit users of the obstacle course. For example, the information may be communicated to an insurance company, such as a life insurance or health insurance company, for the purpose of providing users of the obstacle course with reduced premiums, copays, or other related rates. Insurance companies may be motivated to reduce rates for users of the obstacle course at least partially because of the group size of users of the obstacle course (or gym or health club or network of clubs incorporating the obstacle course or courses) and at least partially because of the documented exercise routine of users of the obstacle course. Users of the obstacle course may have documented proof of their better fitness than an average cross section of the population and may be able to demonstrate other documented factors that reduce their chances of illness and early death. Certain of the biological indicators and/or performance indicators measured for users of the obstacle course may aid in negotiation of insurance pricing.

In addition to the various user interfaces 115, 117, and 118 coupled for communication with central computer 132, various point of sale (POS) interfaces 140 and entrance/exit interfaces 142 may also be coupled to central computer 132. POS interfaces 140 may use a characteristic of the user, such as those described above, to allow the user to access a line of credit, a debit account, or an account linked to a credit card or bank account. In this manner, a user may enter a vendor location that includes POS interface 140 to purchase goods or services from the vendor using the characteristic of the user. As an example, a user may enter a restaurant that has a finger print scanner coupled for communication with central computer 132 and use their fingerprint to purchase a drink or a meal. As another example, a user may enlist the services of a masseuse or a personal trainer and use their fingerprint or another characteristic as their method of payment. In certain embodiments, a vendor with a POS interface 140 may include a vendor selling alcoholic beverages. In this embodiment, the user's recognition by the POS interface 140 may also serve as an indication that the user is consuming alcohol. Once it has been recognized that a user is consuming alcohol, the user may be denied access to the obstacle course or workout facilities for a pre-set period of time. The recognition of the user may also be utilized to monitor and limit the number of drinks being served to the user.

Entry/exit interface 142 may also utilize the characteristic of the user to permit entry into or exit from a club incorporating the obstacle course or for pay by use facilities of the club. For example, a user may use their fingerprint to gain access to the obstacle course. Entry/exit interface 142 may not only verify that the user has an account and is authorized the use the obstacle course, but may also debit or charge the users account for the use of the obstacle course.

Figure 4:
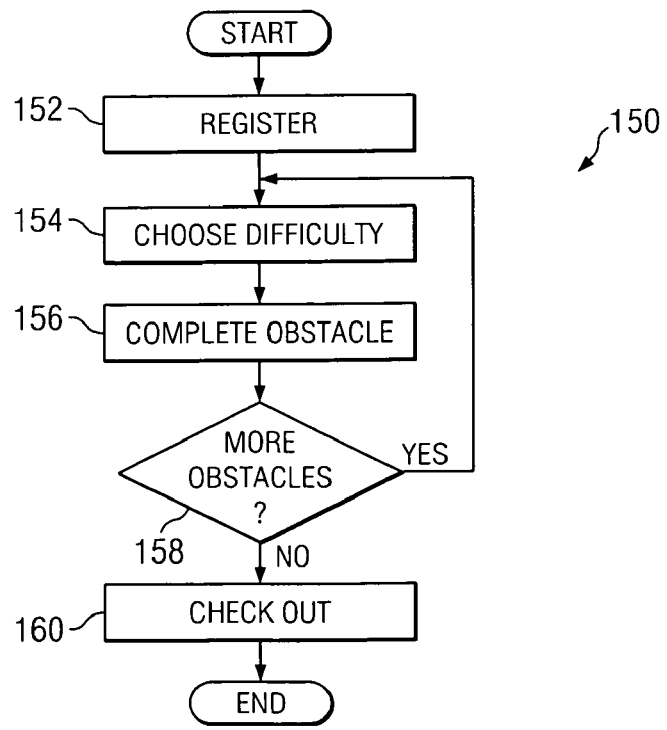
FIG. 4 is a flowchart illustrating a method of using an obstacle course in accordance with a particular embodiment of the present invention.

FIG. 4 illustrates a flowchart 150 illustrating a method of exercising in accordance with the teachings of the present invention. In step 152 a user may register their presence and desire to participate in the obstacle course by registering with a starting user interface, such as user interface 115 described above. In particular embodiments, the starting user interface may not be located within obstacle course 102, but may be located adjacent or proximate the obstacle course as part of a staging area. The staging area may include multiple stations to allow people to register and have their biological indicators measured. The staging area may also include a warm up/cool down area and a social gathering point. In some embodiments, the staging area may also include an ending user interface, or may include starting and ending user interfaces integrated into a single user interface.

At step 152 the various biological indicators of the user may be measured and recorded. Various information on the user's past performances may also be presented to the user so that the user may choose the difficulty that they wish to participate in for the first obstacle. A lane may also be suggested to the user by the user interface. The user will choose the difficulty in step 154. By choosing a difficulty, the user is also choosing a lane. Within that lane will be an obstacle corresponding to the difficulty rating chosen by the user in step 154. In step 156 the user completes the obstacle in the lane with the corresponding difficulty rating chosen in step 154.

In certain embodiments, once the obstacle is complete, the user may check in with a module interface, such as one of user interfaces 118 described above. The module interface may measure various biological indicators and access other performance indicators of the user. Based on those biological and performance indicators, the module interface may suggest to the user a difficulty rating for the next obstacle and/or an increase or decrease in pace.

If there are more obstacles as determined in step 158, the user would choose their difficulty at step 154. If no more obstacles exist in step 158, the user would check out in step 160 using a finish user interface, such as user interface 117 described above. The finish user interface may measure and record various biological indicators of the user and present to the user performance measurements selected by the user. In certain embodiments, the user may choose to print out these performance measurements or have them emailed or otherwise sent to the user. In alternative embodiments, the user may access the performance measurements via the internet.

Many uses and applications exist for the obstacle course and supporting elements described herein. In one embodiment, the obstacle course may be made available to state or municipal governments for use by school children, or an obstacle course could be built on-site at a school. The governments or schools may subsidize use of the facility by the children. In this manner, children may be encouraged toward a healthy level of exercise while having fun during recess, gym class, or after school activities. The facilities could also be used for after school care. In particular embodiments, the facilities could be provided to the schools on a not-for-profit basis and may instill brand loyalty and promote name recognition in the children using the course.

Although the present invention has been described with several embodiments, a myriad of changes, variations, alterations, transformations, and modifications may be suggested to one skilled in the art and it is intended that the present invention encompass such changes, variations, alterations, transformations, and modifications as fall within the scope of the appended claims.

What is claimed is:

1. An obstacle course, comprising:
    obstacles of a first type, the obstacles of the first type modified or presented as a variety of progressive difficulties, the obstacles of the first type positioned or arranged across a path of the obstacle course in a contiguous or side-by-side configuration, and the obstacles of the first type positioned or arranged in a first module such that a user traversing the first module can select which of the obstacles of the first type to traverse;
    obstacles of a second type, the obstacles of the second type modified or presented as a variety of progressive difficulties, the obstacles of the second type positioned or arranged across the path of the obstacle course in a contiguous or side-by-side configuration, the second type being different than the first type, and the obstacles of the second type positioned or arranged in a second module such that a user traversing the second module can select which of the obstacles of the second type to traverse;
    user interfaces, each of the user interfaces configured to:
        recognize a user, and
        measure at least one of a biological indicator of the user or a performance indicator of the user; and
    wherein at least one of the user interfaces is configured to:
        make one or more recommendations to the user on how to continue to traverse the obstacle course based on measurements made by other interfaces.

2. The obstacle course of claim 1, further comprising:
    a first lane, at least one of the obstacles of the first type being located within the first lane, and at least one of the obstacles of the second type being located within the first lane; and
    a second lane, at least another of the obstacles of the first type being located within the second lane, and at least another of the obstacles of the second type being located within the second lane, wherein the first lane and the second lane are side-by-side or contiguous.

3. The obstacle course of claim 2, wherein the first lane is approximately parallel to the second lane.

4. The obstacle course of claim 2, further comprising:
    an observation area for spectators who are not traversing the obstacle course, the obstacle course designed such that the spectators in the observation area have a view of at least one of the obstacles of the first type and do not have a view of at least one of the obstacles of the first type.

5. An obstacle course, comprising:
obstacles of a first type, the obstacles of the first type modified or presented as a variety of progressive difficulties, and the obstacles of the first type positioned or arranged across a path of the obstacle course in a contiguous or side-by-side configuration;
obstacles of a second type, the obstacles of the second type modified or presented as a variety of progressive difficulties, the obstacles of the second type positioned or arranged across the path of the obstacle course in a contiguous or side-by-side configuration, and the second type being different than the first type;
user interfaces, each of the user interfaces configured to:
recognize a user, and
measure at least one of a biological indicator of the user or a performance indicator of the user; and
wherein at least one of the user interfaces is configured to:
make one or more recommendations to the user on how to continue to traverse the obstacle course based on measurements made by other interfaces.

6. The obstacle course of claim 5, further comprising:
a first lane, at least one of the obstacles of the first type being located within the first lane, and at least one of the obstacles of the second type being located within the first lane; and
a second lane, at least another of the obstacles of the first type being located within the second lane, and at least another of the obstacles of the second type being located within the second lane, wherein the first lane and the second lane are side-by-side or contiguous.

7. The obstacle course of claim 6, wherein the first lane is approximately parallel to the second lane.

8. The obstacle course of claim 5, wherein
the obstacles of the first type are positioned or arranged in a first module such that a user traversing the first module can select which of the obstacles of the first type to traverse, and
the obstacles of the second type positioned or arranged in a second module such that a user traversing the second module can select which of the obstacles of the second type to traverse.

9. The obstacle course of claim 8, wherein:
a footprint of the first module is approximately the same as a footprint of the second module, allowing the first and second modules to be interchangeable.

10. The obstacle course of claim 5, further comprising:
obstacles of a third type, the obstacles of the third type modified or presented as a variety of progressive difficulties, the obstacles of the third type positioned or arranged across the path of the obstacle course in a contiguous or side-by-side configuration, and the third type being different than the first type and the second type.

11. The obstacle course of claim 10, further comprising:
a first lane, at least one of the obstacles of the first type being located within the first lane, at least one of the obstacles of the second type being located within the first lane, and at least one of the obstacles of the third type being located within the first lane; and
a second lane, at least another of the obstacles of the first type being located within the second lane, at least another of the obstacles of the second type being located within the second lane, and at least another of the obstacles of the third type being located within the second lane;
a third lane, at least a third of the obstacles of the first type being located within the third lane, at least a third of the obstacles of the second type being located within the third lane, and at least a third of the obstacles of the third type being located within the third lane; and
wherein the first lane, the second lane, and the third lane are configured such that a user traversing the obstacle course may freely move back and forth between the first lane, the second lane, and the third lanes as the lanes are parallel or contiguous.

12. The obstacle course of claim 5, wherein:
the obstacles of the first type are set in the first module,
the obstacles of the second type are set in the second module, and
the first and second modules are removable or interchangeable with one another or different modules.

13. The obstacle course of claim 12, wherein:
the first module has a different footprint than the second module.

14. The obstacle course of claim 5, wherein at least one of the obstacles of the first type or the obstacles of the second type are positioned or arranged across the path of the obstacle course by an ascending or descending level or degree of difficulty.

15. The obstacle course of claim 5, wherein the recommendation is one of increasing a pace, decreasing a pace, switching to obstacles with a higher level or degree of difficulty rating, or switching to obstacles with a lower level or degree of difficulty rating.

16. The obstacle course of claim 5, wherein at least one of the user interfaces is configured to:
make one or more recommendations to the user on how to continue to traverse the obstacle course based on at least one of a biological indicator of the user, a current performance of the user, a historical performance of the user, a historical performance of other users that share at least one performance characteristic with the user, and a biological characteristic of other users.

17. The obstacle course of claim 5, wherein at least one of the user interfaces is embedded within at least one of the obstacles and configured to measure at least one of a biological indicator of the user or a performance indicator of the user while the user is traversing the at least one of the obstacles.

18. The obstacle course of claim 5, wherein one or more user interfaces are configured to:
determine a location of a user in the obstacle course by measuring a proximity of the user to the one or more of the user interfaces located on or within at least one of the obstacles.

19. The obstacle course of claim 5, further comprising:
an observation area for spectators who are not traversing the obstacle course, the observation area of the obstacle course designed such that the spectators in the observation area have a view of at least one of the obstacles of the first type and do not have a view of at least one of the obstacles of the first type.

20. The obstacle course of claim 5, wherein at least one of the user interfaces is configured to:
measure a biological indicator of the user or a performance indicator of the user by capturing, at the at least one of the user interfaces, information transmitted from a wearable device worn by the user.

21. The obstacle course of claim 5, wherein:
a first user interface of the user interfaces is located at a beginning of the obstacle course;
a third user interface of the user interfaces is located at the end of the obstacle course, the third user interface configured to:

present to the user at least one performance measurement, the performance measurement selected from the group consisting of a change in the biological indicator of the user, a change in the performance of the user compared to historical performance of the user, and a comparison of the performance of the user to historical performance of other users that share at least one performance characteristic with the user; and a second user interface of the user interfaces is located between the first user interface and the third user interface, the second user interface configured to:

make one or more recommendations to the user on how to continue to traverse the obstacle course based on at least one of a biological indicator of the user, a current performance of the user, a historical performance of the user, a historical performance of other users that share at least one performance characteristic with the user, and a biological characteristic of other users.

22. The obstacle course of claim 5, wherein at least one of the obstacles is configured such that a non-user of the obstacle course can effectuate movement of the at least one of the obstacles while the user is traversing the at least one of the configured obstacles.

23. The obstacle course of claim 5, wherein at least one of the obstacles is configured such that a second user of the obstacle course can effectuate movement of the at least one of the obstacles while the user is traversing the at least one of the configured obstacles.

24. The obstacle course of claim 5, further comprising:

a first lane, at least one of the obstacles of the first type being located within the first lane, and at least one of the obstacles of the second type being located within the first lane;

a second lane, at least another of the obstacles of the first type being located within the second lane, and at least another of the obstacles of the second type being located within the second lane, wherein the first lane and the second lane are contiguous or side-by-side; and an observation area for spectators that are not traversing the obstacle course, the observation area designed such that the spectators in the observation area have a view of the first lane and do not have a view of the second lane.

25. The obstacle course of claim 5, wherein:

the obstacle course is configured with a path without obstacles that allows a user to bypass a particular set of obstacles.

\* \* \* \* \*